United States Patent
Eisenberg

[11] Patent Number: 5,930,055
[45] Date of Patent: Jul. 27, 1999

[54] LENS APPARATUS

[76] Inventor: Yeshayahu S. Eisenberg, 16 Golomb Street, Kiryat Tivon, Israel, 36000

[21] Appl. No.: 08/809,577
[22] PCT Filed: Sep. 14, 1995
[86] PCT No.: PCT/US95/11608
   § 371 Date: Mar. 26, 1997
   § 102(e) Date: Mar. 26, 1997
[87] PCT Pub. No.: WO96/10206
   PCT Pub. Date: Apr. 4, 1996

[30] Foreign Application Priority Data

Sep. 29, 1994 [IL] Israel ......................................... 111107

[51] Int. Cl.⁶ .................................................. G02B 17/00
[52] U.S. Cl. ............................................. 359/728; 359/727
[58] Field of Search ................................... 359/727, 728, 359/729, 730, 731, 732

[56] References Cited

U.S. PATENT DOCUMENTS

| | | | |
|---|---|---|---|
| 929,795 | 8/1909 | Siedentopf . | |
| 2,378,301 | 6/1945 | Karprelian | 88/57 |
| 2,380,887 | 7/1945 | Warmisham | 88/57 |
| 2,454,144 | 11/1948 | Epstein | 178/5.4 |
| 2,485,345 | 10/1949 | Ackerman | 88/57 |
| 4,576,447 | 3/1986 | Korsch | 350/444 |
| 4,580,197 | 4/1986 | Lum | 362/85 |
| 4,632,521 | 12/1986 | Korsch | 350/505 |
| 4,737,021 | 4/1988 | Korsch | 350/505 |
| 4,770,514 | 9/1988 | Silverglate | 350/443 |
| 5,009,494 | 4/1991 | Iossi et al. | 350/620 |
| 5,042,928 | 8/1991 | Richards | 359/728 |
| 5,078,502 | 1/1992 | Cook | 359/366 |
| 5,473,474 | 12/1995 | Powell | 359/729 |

FOREIGN PATENT DOCUMENTS

| | | |
|---|---|---|
| 380035 | 8/1990 | European Pat. Off. . |
| 2044476 | 10/1980 | United Kingdom . |
| WO 88/03658 | 5/1988 | WIPO . |

OTHER PUBLICATIONS

Hecht, "Optics", 2nd Edition, p. 169, 1990.

C.G. Wynne, Five Spectrograph Camera Designs, Mon. Not. R. Astr. Soc., (1972) 157, pp. 403–418.

S.G.L. Williams, On–Axis Three–Mirror Anastigmat with an Offset Field of View, SPIE vol. 183, Space Optics (1979), pp. 212–216.

L.G. Cook, Three–Mirror Anastigmat Used Off–Axis in Aperture and Field, SPIE vol. 183, Space Optics (1979), pp. 207–211.

*Primary Examiner*—Georgia Epps
*Assistant Examiner*—Suzanne Letendre
*Attorney, Agent, or Firm*—Helfgott & Karas, PC

[57] ABSTRACT

A unitary, at least partially dielectric, element having formed thereon plural electromagnetic radiation reflecting surfaces, at least one of which is a total internal reflection surface.

14 Claims, 3 Drawing Sheets

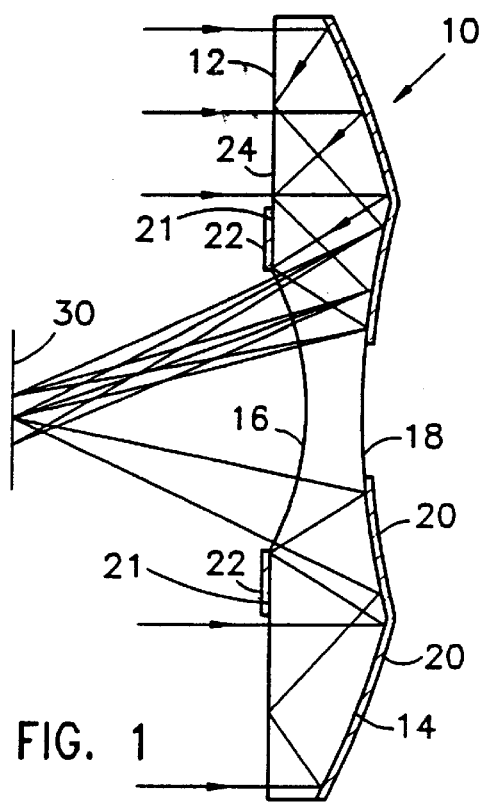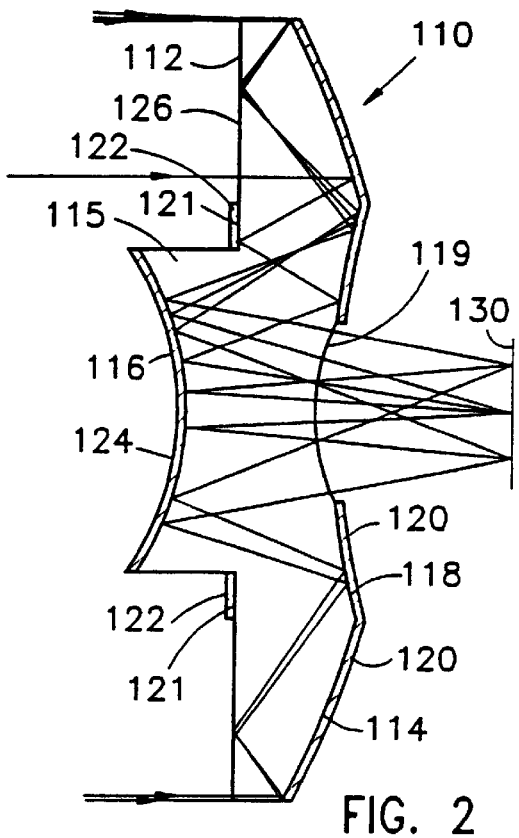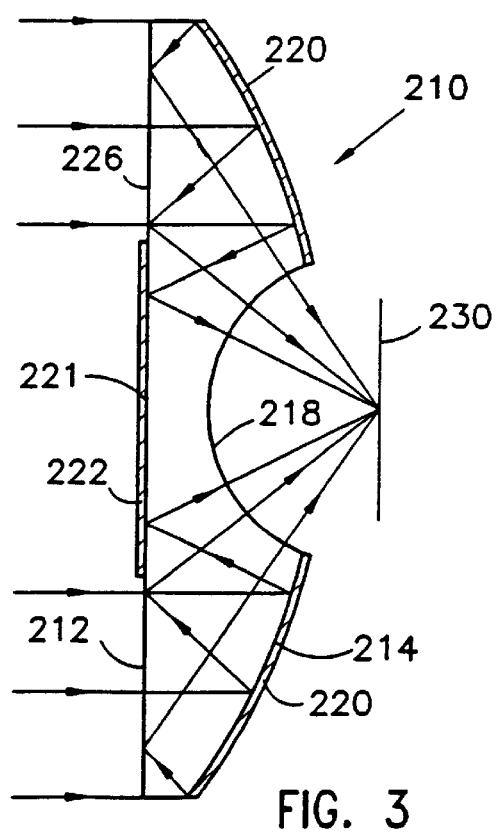

LENS APPARATUS

FIELD OF THE INVENTION

The present invention relates to electromagnetic radiation lens apparatus generally and more particularly to electromagnetic radiation lens apparatus having plural reflective surfaces.

BACKGROUND OF THE INVENTION

There are known various types of electromagnetic radiation lens apparatus having plural reflective surfaces. The following articles and U.S. Patents are believed to represent the state of the art insofar as it relates to visible and near visible electromagnetic radiation: On-axis three-mirror anastigmat with an offset field of view, by S. G. L. Williams, SPIE Vol. 183, Space Optics (1979), pp 212–216; C. G. Wynne, Mon. Not. R. Astr. Soc. (1972) Vol. 157, pp 403–418; U.S. Pat. Nos. 5,078,502; 5,009,494; 4,737,021; 4,632,521; 4,576,447; 2,454,144; 2,378,301; 2,485,345; 2,380,887 and 929,795.

SUMMARY OF THE INVENTION

The present invention seeks to provide improved apparatus constructed of a dielectric material which permits transmission of a spectral wave band of electromagnetic radiation, the dielectric material having plural surfaces which reflect the electromagnetic radiation by being coated with a conductive material, and wherein the dielectric material includes one or more surfaces providing total internal reflectance.

The present invention may be applicable for electromagnetic radiation, generally including for example RF, microwave, infrared, visible and ultraviolet radiation.

There is thus provided in accordance with a preferred embodiment of the present invention a unitary, at least partially dielectric, element having formed thereon plural electromagnetic radiation reflecting surfaces, at least one of which is a total internal reflection surface.

In accordance with a preferred embodiment of the present invention, the unitary element comprises a multi-surface lens. Preferably, the multi-surface lens comprises a solid objective.

Further in accordance with a preferred embodiment of the present invention, the plural electromagnetic radiation reflecting surfaces all have a common axis of symmetry. Alternatively the plural electromagnetic radiation reflecting surfaces may have different axes of symmetry.

In accordance with a preferred embodiment of the present invention, at least one of the plural electromagnetic radiation reflecting surfaces comprises a conical surface of revolution. Alternatively, one or more of the plural electromagnetic radiation reflecting surfaces may be of any other suitable configuration, such as, for example, aspheric surfaces, cubic splines and the like.

There is provided in accordance with a preferred embodiment of the present invention a multi-surface lens formed of a dielectric material and having a generally flat surface and a generally convex surface, the flat surface and the convex surface each having formed therein a portion defining a concave surface, the concave surface formed in the convex surface having a reflective coating formed thereon, the lens being configured and having an index of refraction such that a band of electromagnetic radiation entering the lens undergoes total internal reflection at at least one of the generally flat surface and the generally convex surface.

There is also provided in accordance with a preferred embodiment of the present invention a multi-surface lens formed of a dielectric material and having a generally flat surface and a generally convex surface, the flat surface being formed with a protrusion and the convex surface being formed with a recess, the protrusion and the recess each having formed therein a concave surface, the concave surface formed in the convex surface having a reflective coating formed thereon, the lens being configured and having an index of refraction such that a band of electromagnetic radiation entering the lens undergoes total internal reflection at at least one of the generally flat surface and the generally convex surface.

In accordance with a preferred embodiment of the present invention, the concave surface formed in the convex surface is reflectively coated on a portion thereof, thereby defining an uncoated portion of the concave surface, the reflectively coated portion and the uncoated portion of the concave surface having different radii of curvature.

There is also provided in accordance with a preferred embodiment of the present invention, a multi-surface lens formed of a dielectric material and having a generally flat surface and a generally convex surface, the convex surface having formed therein a recess defining a concave surface, the convex surface having a reflective coating formed thereon and the flat surface having a reflective coating formed on a portion thereof, thereby defining an annular portion on the flat surface with no reflective coating, the lens being configured and having an index of refraction such that a band of electromagnetic radiation entering the lens undergoes total internal reflection at the annular portion.

It is noted that throughout the specification and claims, concave and convex surfaces refer to the outer surface of the dielectric material.

The multi-surface lens may be used in afocal systems with angular magnification, such as a telescope, a modified Newtonian telescope, or forward-looking infrared (FLIR) systems.

The multi-surface lens may be used in transmitter systems, such as illuminators, such as a flash lamp, vehicle headlamp, spot light illuminator, operating room illuminator.

BRIEF DESCRIPTION OF PREFERRED EMBODIMENTS

The present invention will be understood and appreciated more fully from the following detailed description, taken in conjunction with the drawings in which:

FIG. 1 is a simplified illustration of a partially coated composite lens constructed and operative in accordance with one preferred embodiment of the present invention, used to receive and concentrate, image and focus a band of electromagnetic radiation;

FIG. 2 is a simplified illustration of a partially coated composite lens constructed and operative in accordance with another preferred embodiment of the present invention, used to receive and concentrate, image and focus a band of electromagnetic radiation;

FIG. 3 is a simplified illustration of a partially coated composite lens constructed and operative in accordance with yet another preferred embodiment of the present invention, used to receive and concentrate, image and focus a band of electromagnetic radiation;

DETAILED DESCRIPTION OF PREFERRED EMBODIMENTS

Figure 4:
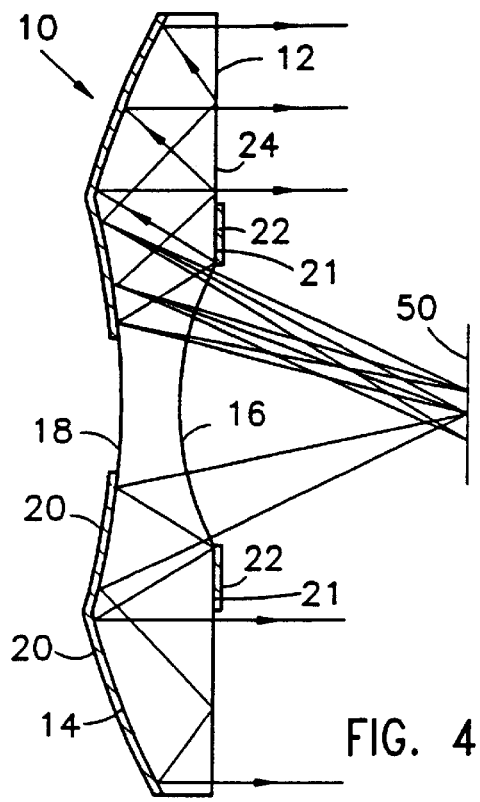
FIG. 4 is a simplified illustration of the partially coated composite lens of FIG. 1 used to transmit a band of electromagnetic radiation.

Reference is now made to FIG. 1 which illustrates a multi-surface lens 10 formed of a dielectric material, constructed and operative in accordance with a preferred embodiment of the present invention. The dielectric material is at least partially transmissive for a spectral wave band of electromagnetic radiation.

The multi-surface lens 10 defines a generally flat surface 12 and a generally convex surface 14. The generally flat surface 12 and the generally convex surface 14 each have formed therein respective portions defining concave surfaces designated respectively by reference numerals 16 and 18.

In accordance with a preferred embodiment of the invention, both the convex surface 14 and the concave surface 18 have formed thereon a conductive, that is, reflective coating 20. Additionally, a portion 21 of the flat surface 12 preferably has formed thereon a reflective coating 22. The remainder of the flat surface 12 defines an annular window 24 through which an incoming band of electromagnetic radiation may be received.

In accordance with a preferred embodiment of the invention, the lens 10 is configured and has an index of refraction, such that electromagnetic waves entering the lens 10 via window 24 are reflected by reflective coating 20 at convex surface 14 at a required angle such that thereafter the rays of electromagnetic radiation undergo total internal reflection at window 24 as well as reflection at coated portion 21 on surface 12. Alternatively, portion 21 may be uncoated and lens 10 may be configured such that the rays of electromagnetic radiation undergo total internal reflection at portion 21.

Following this second reflection, the electromagnetic radiation is reflected off coating 20 at concave surface 18, and transmitted through, and may be refracted by, surface 16 to a focal plane 30.

Reference is now made to FIG. 2, which illustrates a multi-surface lens 110 formed of a dielectric material, constructed and operative in accordance with a preferred embodiment of the present invention. The dielectric material is at least partially transmissive for a spectral wave band of electromagnetic radiation.

The multi-surface lens 110 defines a generally flat annular surface 112 and a generally convex surface 114. Centrally disposed with respect to surface 112 is a protrusion 115 defining a concave surface 116. The generally convex surface 114 has formed therein a concave surface 118.

In accordance with a preferred embodiment of the invention, both the convex surface 114 and the concave surface 118 have formed thereon a conductive, that is, reflective coating 120. In accordance with a preferred embodiment of the present invention, an uncoated portion of surface 118, designated by numeral 119, may have a different radius of curvature than the portions of surface 118 which are coated with reflective coating 120, as seen in FIG. 2.

Additionally, a portion 121 of the flat surface 112 preferably has formed thereon a reflective coating 122 and surface 116 has formed thereon a reflective coating 124. The remainder of the flat surface 112 defines an annular window 126 through which an incoming spectral wave band of electromagnetic radiation may be received.

In accordance with a preferred embodiment of the invention, the lens 110 is configured and has an index of refraction such that electromagnetic waves entering the lens 110 via window 126 are initially reflected by reflective coating 120 at convex surface 114 at a required angle such that thereafter the rays of electromagnetic radiation undergo total internal reflection at window 126 as well as reflection at coated portion 121 on surface 112. Alternatively, portion 121 may be uncoated and lens 110 may be configured such that the rays of electromagnetic radiation undergo total internal reflection at portion 121.

Following this second reflection, the electromagnetic radiation is reflected off coating 120 at concave surface 118 to surface 116, where it is again reflected by coating 124, transmitted through, and may be refracted by, surface 119 onto an external focal plane 130, which may be flat or curved.

Reference is now made to FIG. 3, which illustrates a multi-surface lens 210 formed of a dielectric material, constructed and operative in accordance with a preferred embodiment of the present invention. The dielectric material is at least partially transmissive for a spectral wave band of electromagnetic radiation.

The multi-surface lens 210 defines a generally flat surface 212 and a generally convex surface 214. The generally convex surface 214 has formed therein a concave surface 218.

In accordance with a preferred embodiment of the invention, the convex surface 214 has formed thereon a conductive, that is, reflective coating 220. Additionally, a portion 221 of the flat surface 212 preferably has formed thereon a reflective coating 222. The remainder of the flat surface 212 defines an annular window 226 through which an incoming band of electromagnetic radiation may be received.

In accordance with a preferred embodiment of the invention, the lens 210 is configured and has an index of refraction such that electromagnetic radiation entering the lens 210 via window 226 is initially reflected by reflective coating 220 at convex surface 214 at a required angle such that thereafter the rays of electromagnetic radiation undergo total internal reflection at window 226 as well as reflection at coated portion 221 on surface 212. Alternatively, portion 221 may be uncoated and lens 210 may be configured such that the rays of electromagnetic radiation undergo total internal reflection at portion 221.

Following the second reflection, the electromagnetic radiation is reflected off surface 212 and transmitted through, and may be refracted by, surface 218 to an external image plane 230.

Figure 7:
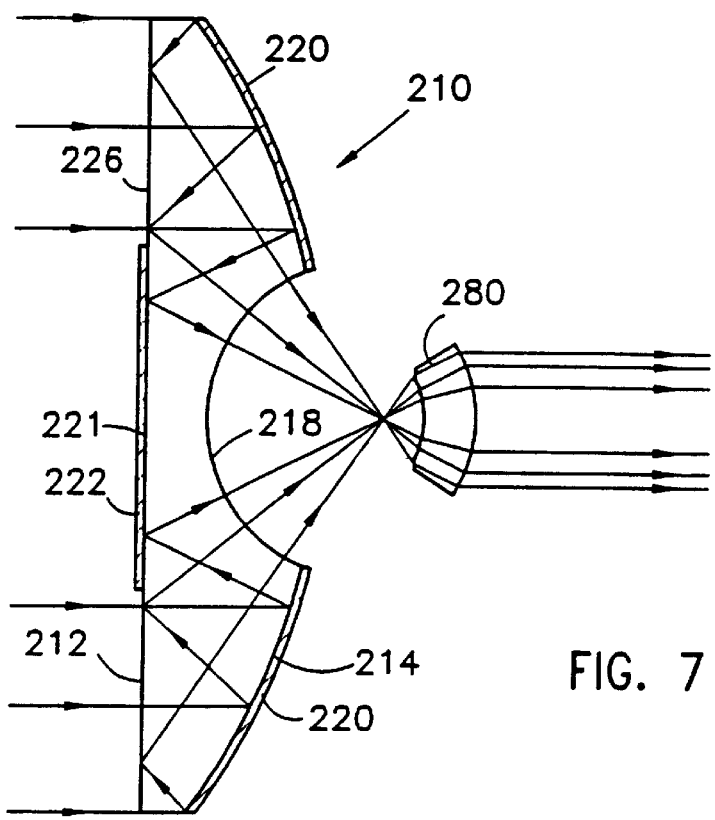
FIG. 7 is a simplified illustration of an afocal system with angular magnification, constructed and operative in accordance with a preferred embodiment of the present invention.

The partially coated composite lenses of FIGS. 1–3 may be used in a variety of afocal systems with angular magnification, as seen in FIG. 7. The angular magnification may be accomplished using lenses 280, as seen in FIG. 7.

Examples of such afocal systems are telescopes, a modified Newtonian telescope and forward-looking infrared (FLIR) systems. The partially coated composite lenses of FIGS. 1–3 may also be used in a system for aiding the vision of visually impaired persons.

Figure 5:
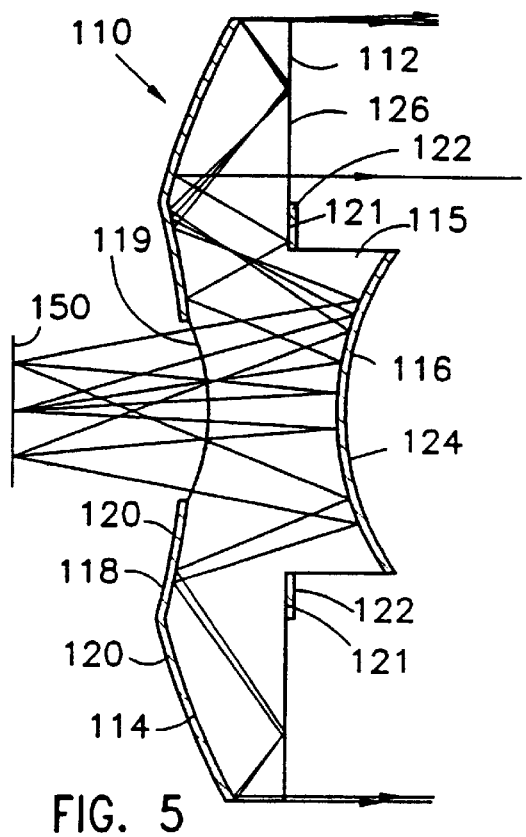
FIG. 5 is a simplified illustration of the partially coated composite lens of FIG. 2 used to transmit a band of electromagnetic radiation.
Figure 6:
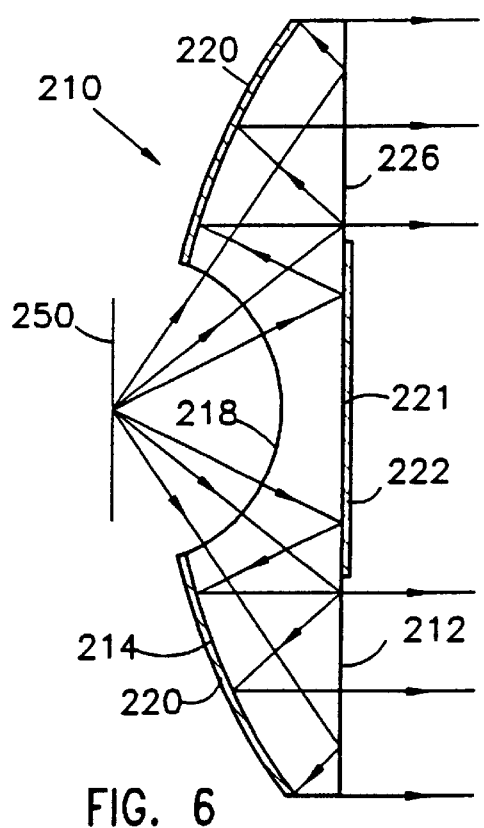
FIG. 6 is a simplified illustration of the partially coated composite lens of FIG. 3 used to transmit a band of electromagnetic radiation.

Reference is now made to FIGS. 4–6 in which it seen that the partially coated lenses of FIGS. 1–3 respectively may be used to transmit a band of electromagnetic radiation. Focal planes 30, 130 and 230 respectively are replaced by sources 50, 150 and 250 respectively of electromagnetic radiation.

Figure 8:
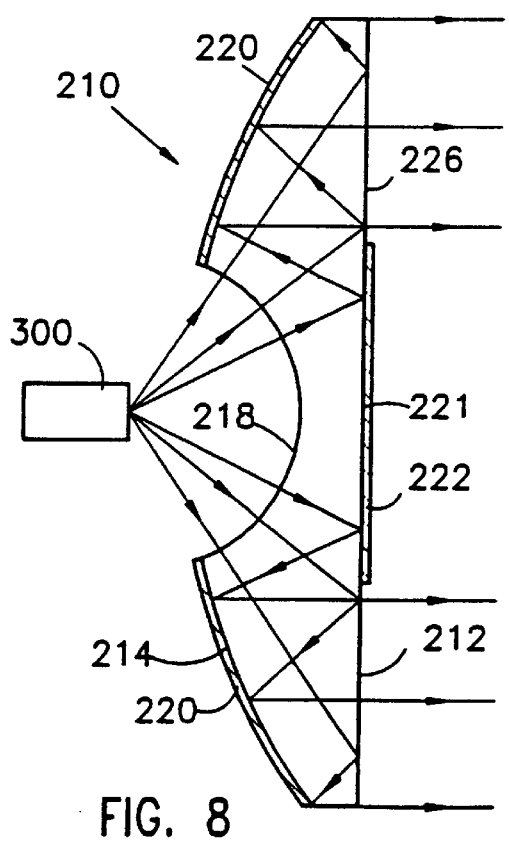
FIG. 8 is a simplified illustration of a transmitter of a band of electromagnetic radiation, constructed and operative in accordance with a preferred embodiment of the present invention.

Reference is now made to FIG. 8 which illustrates the partially coated lens of FIG. 6 used as a transmitter for a source 300 of a band of electromagnetic radiation. Examples of such a transmitter are illuminators, such as a flash lamp, vehicle headlamp, spot light illuminator, operating room illuminator.

It will be appreciated by persons skilled in the art that the present invention is not limited by what has been particularly shown and described hereinabove. Rather the scope of the present invention is defined only by the claims which follow:

I claim:

1. A unitary, at least partially dielectric, element having formed thereon plural electromagnetic radiation reflective surfaces, at least one of which is a total internal reflection surface, such that the radiation is internally reflected from a portion of said surface which does not have a substantially reflective coating formed thereon, wherein said plural electromagnetic radiation reflecting surfaces have different axes of symmetry.

2. A unitary, at least partially dielectric, element having formed thereon plural electromagnetic radiation reflective surfaces, at least one of which is a total internal reflection surface, such that the radiation is internally reflected from a portion of said surface which does not have a substantially reflective coating formed thereon, wherein at least one of said plural electromagnetic radiation reflecting surfaces comprises a conical surface of revolution.

3. A multi-surface lens formed of a dielectric material and having a first side and a second side, each side having formed therein a portion defining a concave surface, said second side having a reflective coating formed thereon, said lens being configured and having an index of refraction such that a band of electromagnetic radiation entering said lens undergoes total internal reflection at at least one of said first and second sides, such that the radiation is internally reflected from a portion of said at least one side which does not have a substantially reflective coating formed thereon.

4. A lens according to claim 3, wherein a reflective coating is formed on a portion of said first side, generally adjacent to said concave surface formed therein.

5. A multi-surface lens formed of a dielectric material and having a first side and a second side, each side having formed therein a portion defining a concave surface, said second side having a reflective coating formed thereon, said lens being configured and having an index of refraction such that a band of electromagnetic radiation entering said lens undergoes total internal reflection at at least one of said first and second sides, wherein a reflective coating is formed on a portion of said first side, generally adjacent to said concave surface formed therein, wherein said first side includes a generally flat surface, and wherein said reflective coating is formed on a portion of said flat surface.

6. A lens according to claim 3, wherein said second side includes a generally convex surface, generally adjacent to said concave surface therein.

7. A multi-surface lens formed of a dielectric material and having a first side and a second side, each side having formed therein a portion defining a concave surface, said second side having a reflective coating formed thereon, said lens being configured and having an index of refraction such that a band of electromagnetic radiation entering said lens undergoes total internal reflection at at least one of said first and second sides, wherein said first side has a protrusion thereon, and wherein said concave surface formed in said first side is formed within said protrusion.

8. A lens according to claim 7, wherein a reflective coating is formed on said concave surface formed in said first side.

9. A lens according to claim 7, wherein said first side includes a generally flat surface, generally adjacent to said protrusion.

10. A lens according to claim 7, wherein said second side includes a generally convex surface, generally adjacent to said concave surface therein.

11. A multi-surface lens formed of a dielectric material and having a first side and a second side, each side having formed therein a portion defining a concave surface, said second side having a reflective coating formed thereon, said lens being configured and having an index of refraction such that a band of electromagnetic radiation entering said lens undergoes total internal reflection at at least one of said first and second sides, wherein said reflective coating on said second side is formed on a portion of said concave surface in said second side, thereby defining an uncoated portion of said concave surface, said reflectively coated portion and said uncoated portion of said concave surface having different radii of curvature.

12. A transmitter of a band of electromagnetic radiation comprising a source of said band of radiation and a lens, according to claim 3, which receives and collimates radiation emitted by said source.

13. A multi-surface lens formed of a dielectric material and having a generally flat surface and a generally convex surface, said convex surface having formed therein a recess defining a concave surface, said convex surface having a reflective coating formed thereon and said flat surface having a reflective coating formed on a portion thereof, thereby defining an annular portion on said flat surface with no reflective coating, said lens being configured and having an index of refraction such that a band of electromagnetic radiation entering said lens undergoes total internal reflection at said annular portion.

14. An afocal angular magnification system comprising a unitary, at least partially dielectric, element having formed thereon plural conductive surface which are reflective to a band of electromagnetic radiation, at least one of which is a total internal reflection surface, such that the radiation is internally reflected from a portion of said surface which does not have a substantially reflective coating formed thereon.

* * * * *